Patented Jan. 9, 1934

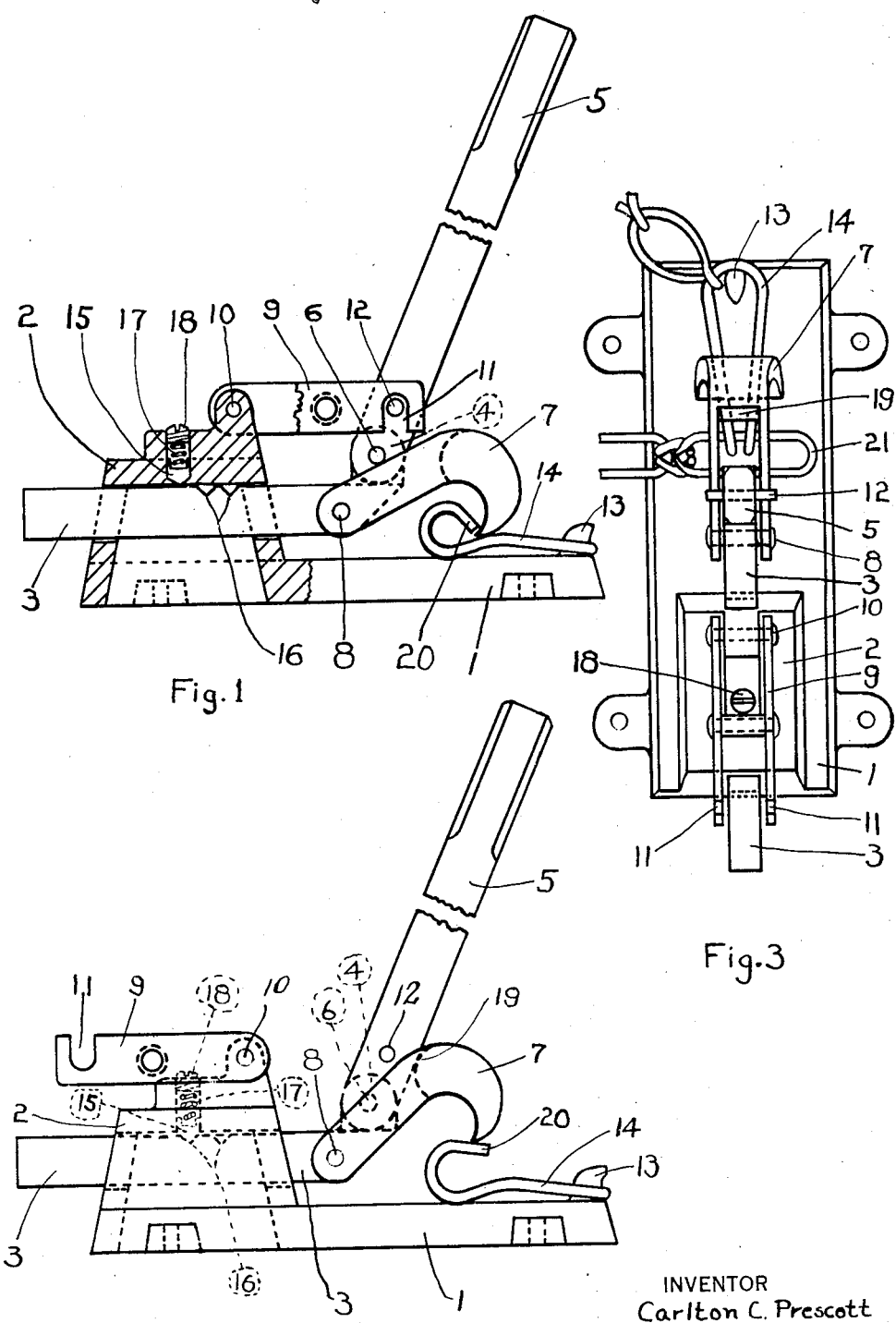

1,942,447

UNITED STATES PATENT OFFICE 1,942,447

TOOL

Carlton C. Prescott, Menlo Park, N. J.

Application April 2, 1932. Serial No. 602,732

10 Claims. (Cl. 81—15)

My invention relates to tools usable for various purposes and particularly to tools especially adapted for use in removing or attaching the transverse chains of tire chains.

Many tools for this general purpose have heretofore been produced, but they have all, so far as I am aware, been provided with overlapping jaws or wedge-like parts that are forced sidewise under the bills of the cross chain hook to pry same open. This procedure provides little, if any, means for holding the cross chain straight during the opening. These tire chain tools which, generally speaking, are of the plier type, tend to stick at the end of the wedging operation which opens the end hook of the cross chain and moreover, they not infrequently get tangled up with the side chains to which the cross chain is hooked. These difficulties, I have found, can be avoided by using an entirely different type of tool wherein a pulling action opens the hook and a compression force closes same.

Accordingly, among the objects of the present invention is the provision of a novel tool which may be used for opening and closing the end hooks of tire chain cross chains. A further object of the invention is to provide a tool of the class described which is very compact, may be carried in the tool compartment of a motor vehicle without occupying an excessive amount of space, may be mounted on a bench, is of simplified construction, efficient in use, and economical to manufacture. Other objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In said annexed drawing:—

Fig. 1 is a partially sectioned side-view of my improved tool in position for opening a cross chain end hook; Fig. 2 is a side-view of my tool in position for closing a cross chain end hook; and Fig. 3 is a plan view of the tool with the operating lever in vertical position.

In the drawing I have shown the preferred embodiment of my invention in diagrammatic manner and in connection with the opening and closing of an end hook of a tire chain cross chain. For simplicity of showing and understanding the invention, I have merely shown in Figs. 1 and 2 an end hook being opened and closed, since obviously the cross chain as well as the side chains could be connected thereto without changing the principle of the invention.

Referring more particularly to the drawing, the base 1 of the tool which may be of cast iron, steel, or other common structural metal, is provided with a raised portion 2 at one end thereof, through which a slide bar 3 is movable. One end of the slide bar is provided with a raised portion 4 to which a lever 5 is pivotally fastened by means of a pin or rivet 6. The same end of the slide bar is also provided with a dog 7 pivotally mounted thereon by means of pin or rivet 8. Dog 7 and slide bar 3 are preferably mounted a sufficient distance above the base 1 of the tool to permit a circumferential or side chain 21 of the tire chain to pass freely thereunder. Connecting link 9 is pivotally mounted on the top of the raised portion 2 of the base by means of a pin or rivet 10. The connecting link 9 is provided at its free end with a hook portion 11 which is adapted to engage with a pin 12 on lever 5 near the pivot pin 6 thereof. The end opposite the raised portion of the base 1 is provided with a hook-like projection 13 which may be cast in place, screwed, or otherwise adequately fastened thereto.

The operation of my improved tool is as follows: To open the end hook 14 of a cross chain, I place same as is shown in Fig. 1 with the end hook of the cross chain straddling hook 13 of the base 1. Dog 7 is then placed with its hook end behind bills 20 of the cross chain end hook which are to be pulled away from the body thereof. With the dog 7 in place and connecting link 9 hooked over pin 12 on lever 5, the apparatus is ready for opening end hook 14. The opening is then accomplished by forcing lever 5 to the right which pushes slide bar 3 to the left and with it dog 7, which pulls the end hook of the cross chain open to the extent for instance as is shown in Fig. 2. Dog 7 may be then released by moving lever 5 to the left following which cross chain end hook 14 may be removed from the tool.

The replacement of a cross chain and the closing of the bills of an end hook thereof is accomplished by straddling cross chain end hook 14 over hook 13 with the bills 20 thereof up. Connecting link 9 is swung back out of the way, as shown in Figs. 2 and 3, and slide bar 3 pushed to the left until pin 15 engages with notch 16 in the top of slide bar 3. Pin 15 is held in continuous engagement with the top of slide bar 3 by means of a compression spring 17 which is supported at its upper end by a screw 18 engaging with a threaded opening in the upper part of raised portion 2 of base 1. The engaging of pin 15 with notch 16 provides sufficient resistance to endwise slippage of slide bar 3 to prevent dog 7 from slipping off the end of bills 20 of end hook 14 during the compression or closing operation. To close the cross chain end hook it is placed as shown in Fig. 2 with lever 5 pressing against the upper face 19 of dog 7. The movement of lever 5 to the right and downward forces dog 7 in a downward direction, which pushes the extended bills 20 of the cross chain end hook downward into closed position. The pressure may then be released and lever 5 moved to the left following which the chain can be removed from the tool and the end hook at the other end of the cross chain closed in like manner.

The present machine is not limited to the opening of one size of cross chain end hook, and neither is it limited to closing only one size of same. Slide bar 3, for instance, may be provided with a series of notches 16 which will serve to hold it in place during the closing of various size hooks. It, further, is not limited to use in connection with the opening and closing of the end hooks of a tire chain cross chain since obviously it is adapted for use in connection with the opening or spreading of various kinds of hooks and pieces of equipment and moreover, it may be used, preferably with a less pointed hook, in the closing or compressing of various things such as driving and clinching rivets, joining the ends of a belt with metal lacing, etc.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:—

1. A device of the class described, comprising a base having a guide means at one end, a movable member mounted in connection with and in movable relation to said guide means, a member pivotally mounted on one end of said movable member, said pivotally mounted member being adjacent to said base and having its free end hook-shaped and facing said base, and means for forcing the hook end of said pivotally mounted member toward said base.

2. A device of the class described, comprising a base having a guide means at one end and a hook at the other, a movable member mounted in connection with and in movable relation to said guide means, a member pivotally mounted on the end of said movable member nearest said hook, said pivotally mounted member having its free end hook-shaped and facing said base, and means for moving the hook end of said pivotally mounted member in a line between the guide and hook ends of said base.

3. A device of the class described, comprising a base having a guide means at one end and a hook at the other, a movable member mounted in connection with and in movable relation to said guide means, a member pivotally mounted on the end of said movable member nearest said hook, said pivotally mounted member having its free end hook-shaped and facing said base, and means for forcing the hook end of said pivotally mounted member towards said base and also in a line between the guide and hook ends thereof.

4. A device of the class described, comprising a base having a raised member at one end, a slidable member guided by said raised member, a dog pivotally mounted on one end of said slidable member and having its free end in the form of a hook facing the base of the device, and lever means for forcing the hook end of the dog toward said base.

5. A device of the class described, comprising a base having a hook at one end and a raised member at the other, a slidable member guided by said raised member in line with said hook, a dog pivotally mounted on the end of said slidable member nearest said hook, and having its free end in the form of a hook facing the base of the device, and means for moving the slidable member endwise.

6. A device of the class described, comprising a base having a hook at one end and a raised member at the other, a slidable member guided by said raised member, a dog pivotally mounted on the end of said slidable member nearest said hook, and having its free end in the form of a hook facing the base of the device, and means for moving the slide bar endwise and the hooked end of the dog toward said base.

7. A tire chain tool having a guide, and an endwise movable member in operative relation thereto, a hook-type dog pivoted on said member at one end and capable of endwise and pivotal movement, and means to move said dog endwise and about its pivot.

8. In a tire chain tool the combination of a base having a hook at one end and a raised member at the other, a slide bar guided by said raised member and movable endwise in a line between said hook and the raised portion of the base, a dog pivotally mounted on one end of the slide bar and having its hook end facing the base of the tool between the raised member and hook on the end thereof, a lever pivotally mounted on the same end of the slide bar as the dog, and a connecting link pivotally mounted on said raised portion of the base and adapted to engage with the aforementioned lever.

9. In a tire chain tool the combination of a base having a hook at one end and a raised portion at the other, a slide bar movable through said raised portion in a direction in line with said hook, a dog pivotally mounted on the end of the slide bar between said hook and raised portion of the base, said dog having its free end in the form of a hook facing the base of the tool, a lever pivotally mounted on the same end of the slide bar as the dog and in parallel pivotal relation therewith, said lever being arranged for forcing the hook end of the dog toward the base of the tool, and a connecting link pivotally mounted on said raised portion of the base and adapted to engage with the aforementioned lever near its pivot to act as a fulcrum for same in moving the slide bar and dog endwise.

10. A tire chain tool consisting of a base having a hook at one end and a raised portion at the other, a slide bar movable through said raised portion in a direction in line with said hook, a dog pivotally mounted on the end of the slide bar between said hook and raised portion of the base, said dog having its free end in the form of a hook facing the base of the tool, a lever pivotally mounted on the same end of the slide bar as the dog and in parallel pivotal relation therewith, said lever being arranged for forcing the hook end of the dog toward the base of the tool, a connecting link pivotally mounted on said raised portion of the base and adapted to engage with the aforementioned lever near its pivot to act as a fulcrum for same in moving the slide bar and dog endwise, and resistance means for opposing free endwise movement of the slide bar.

CARLTON C. PRESCOTT.